United States Patent [19]

Dieck et al.

[11] 4,373,067

[45] Feb. 8, 1983

[54] MOLDED ARTICLES OF IMPROVED IMPACT RESISTANCE AND COMPOSITIONS THEREFOR

[75] Inventors: Ronald L. Dieck, Sunnyvale, Calif.; Robert J. Kostelnik, Glenalden, Pa.

[73] Assignee: General Electric Company, Pittsfield, Mass.

[21] Appl. No.: 289,966

[22] Filed: Aug. 4, 1981

[51] Int. Cl.³ .................... C08L 67/00; C08L 69/00
[52] U.S. Cl. .................................. 525/146; 524/281; 524/412; 524/492; 524/493; 524/508; 524/513; 524/515; 524/539; 525/166; 525/177
[58] Field of Search ................ 525/146, 166, 177; 260/40 R; 524/281, 412, 492, 493, 508, 513, 515, 539

[56] References Cited

U.S. PATENT DOCUMENTS

| | | | |
|---|---|---|---|
| 2,465,319 | 3/1949 | Whinfield et al. | 525/177 |
| 3,047,539 | 7/1962 | Pengilly | 525/177 |
| 3,591,659 | 7/1971 | Brinkmann et al. | 525/177 |
| 3,701,702 | 10/1972 | Schichman et al. | 525/177 |
| 3,833,685 | 9/1974 | Wambach | 525/177 |
| 3,864,429 | 2/1975 | Nakamura | 525/177 |
| 3,937,757 | 2/1976 | Seydl et al. | 525/177 |
| 3,953,394 | 4/1976 | Fox et al. | 525/177 |
| 3,969,306 | 7/1976 | Borman et al. | 525/177 |
| 4,022,748 | 5/1977 | Schlichting et al. | 525/177 |
| 4,034,013 | 7/1977 | Lane | 525/177 |
| 4,044,073 | 8/1977 | Baron et al. | 525/177 |
| 4,096,202 | 6/1978 | Farnham et al. | 525/177 |
| 4,141,863 | 2/1979 | Goran et al. | 525/177 |
| 4,203,887 | 5/1980 | Goedde et al. | 525/177 |

*Primary Examiner*—J. Ziegler
*Attorney, Agent, or Firm*—Hedman, Casella, Gibson & Costigan

[57] ABSTRACT

Modified thermoplastic polyester molding compositions are provided which comprise (a) a poly(1,4-butylene terephthalate) resin and (b) a modifier therefor comprising at least one member of the group consisting of cis-polybutadiene, poly(butadiene-acrylonitrile), and poly(isoprene-isobutylene), and, optionally: (c) one or more poly($C_2$–$C_6$-alkylene phthalate) resins; (d) an aromatic polycarbonate as supplementary modifier for improving the resistance of articles molded from the composition to fracture on impact; (e) polyethylene as carrier for said component (b); (f) one or more fillers and/or reinforcing agents; and (g) a flame retardant.

20 Claims, No Drawings

MOLDED ARTICLES OF IMPROVED IMPACT RESISTANCE AND COMPOSITIONS THEREFOR

This invention relates to modified thermoplastic polyester compositions which are moldable to provide articles of improved resistance to fracture upon impact and includes the molded articles themselves. More particularly, the invention relates to compositions of (a) a poly(1,4-butylene terephthalate) resin and (b) at least one member of the group consisting of cis-polybutadiene, poly(butadiene-acrylonitrile), and poly(isoprene-isobutylene) as agents which provide improved resistance to fracture. Optionally present are (c) one or more poly($C_2$–$C_6$-alkylene phthalate) resins; (d) one or more aromatic polycarbonates as agents providing supplementary fracture resistance; (e) polyethylene as carrier for component (b); (f) one or more fillers and/or reinforcing agents; and (g) a flame retardant.

BACKGROUND OF THE INVENTION

High molecular weight linear polyesters including copolyesters of glycols with terephthalic and isophthalic acids have been available for many years. Certain of these are described in Whinfield et al., U.S. Pat. No. 2,465,319 and in Pengilly U.S. Pat. No. 3,047,539. These patents disclose that the polyesters are particularly advantageous as film and fiber formers.

With the development of molecular weight control, the use of nucleating agents and two-step molding cycles, poly(ethylene terephthalate) has become an important constituent of injection moldable compositions. Poly(1,4-butylene terephthalate), because of its very rapid crystallization from the melt, is outstandingly useful as a component of such compositions. Workpieces molded from such polyester resins, alone or combined with reinforcements, in comparison with other thermoplastic moldings, possess a high degree of surface hardness and abrasion resistance, high gloss, and lower surface friction. Molded articles find use in radio and television applications and as housings for electrical hand tools and industrial and kitchen appliances.

Stable polyblends of poly(1,4-butylene terephthalate) and poly(ethylene terephthalate) can be molded into useful unreinforced and reinforced articles; see Fox and Wambach U.S. Pat. No. 3,953,394.

Block copolyesters containing units derived from poly(1,4-butylene terephthalate) and from an aromatic-/aliphatic or aliphatic polyester are also known; see copending application Ser. No. 752,325 filed on Dec. 20, 1976, now abandoned by Borman et al. Such block copolyesters are useful alone as molding resins and also in intimate combination with poly(1,4-butylene terephthalate) and/or poly(ethylene terephthalate).

It has been proposed to increase the impact strengths of moldings prepared from polyesters by adding various modifiers. For example, Brinkmann et al., in U.S. Pat. No. 3,591,659 disclose that a useful family of modifiers comprises polyalkyl acrylates, methacrylates and/or ethacrylates. Nakamura et al. in U.S. Pat. No. 3,864,428 propose polyarylene carbonates and certain graft copolymers of polybutadiene; Seydl et al. in U.S. Pat. No. 3,937,757 and Lane in U.S. Pat. No. 4,034,013 propose polyethylene for the purpose; Baron et al., in U.S. Pat. No. 4,044,073 disclose that a useful impact modifier for such polyesters is an aromatic polycarbonate; Schlichting et al. in U.S. Pat. No. 4,022,748 disclose that a rubber-elastic graft copolymer having a glass temperature below $-20°$ C. is a useful modifier; Lane, U.S. Pat. No. 4,034,013 and Farnham et al., U.S. Pat. No. 4,096,202 disclose that useful impact modifiers comprise multiple state polymers having a rubbery first stage and a hard final stage, preferably including units derived from alkyl acrylates; Lane U.S. Pat. No. 4,034,013 discloses isotatic 1-polybutylene; Baron et al. in U.S. Pat. No. 4,034,016 disclose an impact modifier combination comprising a mixture of a polyurethane and an aromatic polycarbonate; Goedde et al. in U.S. Pat. No. 4,203,887 discloses an impact modifier combination comprising a segmented block copolyester and an aromatic polycarbonate; and Cohen et al. copending application Serial. No. 957,801 filed on Nov. 6, 1978, now U.S. Pat. No. 4,257,937 discloses that a combination of a polyacrylate resin and an aromatic polycarbonate resin is suitable for the purpose.

All of the foregoing patents and patent applications are hereby incorporated herein by reference.

The discoveries have now been made that polybutylene terephthalate-based molding compositions are compatible with cis-polybutadiene, poly(butadiene-acrylonitrile) and poly(isobutylene-isoprene), and that such molding compositions which contain a minor proportion of one or more of the above-mentioned vinyl polymers provide molded articles with greatly improved resistance to fracture upon impact.

Further discoveries have been made that the foregoing compositions are compatible with the aromatic polycarbonates and that the presence of a minor amount of one or more of these polycarbonates in the molding composition provides molded articles of even better resistance to fracture upon impact.

The aforementioned vinyl polymers consist essentially of carbon-to-carbon chains which contain residual olefinic unsaturation and which carry only hydrogen, vinyl, isopropenyl, methyl, and/or nitrile as their substituents. Other substituents, for example chloro, carboxymethyl, phenyl and methoxy can be present, which can be provided by adding the appropriate copolymerizable vinyl monomers to the mixtures from which the polymers are prepared, in such small proportion as not to alter the essential character of the polymer. Best results to date have been obtained when the polymer chains contain one point of olefin unsaturation for every 10 to 100 chain carbon atoms, when the chains contain at least one substituent for every two chain carbon atoms, and when these substituents are methyl and nitrile substituents in 10:1 to 100:1 molar ratio. The reason why the polymers described above are so effective in imparting fracture resistance to the moldings is not known, and applicants do not wish to be bound by any theory.

DESCRIPTION OF THE INVENTION

According to this invention, there are provided thermoplastic compositions which are useful for molding industrial and household articles by injection molding, compression molding, transfer molding and the like, the compositions comprising:
(i) a poly(butylene terephthalate) resin as the principal resinous component therein, and
(ii) a minor amount of at least one rubbery vinyl polymer selected from the group consisting of cis-polybutadiene, poly(butadiene-acrylonitrile), and poly(isoprene-isobutylene) as agent improving the resistance to fracture on impact of articles molded from said composition.

Polyester resins suitable for use as component (i) in the composition are available commercially. If preferred, they can be prepared by known methods such as by the alcoholysis of the dimethyl ester of terephthalic acid with an appropriate diol such as 1,4-butanediol until the new ester has an intrinsic viscosity of about 0.7 dl./g. and preferably more than 0.8 dl./g. measured in a 60:40 phenol; tetrachloroethane mixture at 30° C. They can also be prepared by heating the glycols with terephthalic acid or its acid dihalide.

Especially useful when high melt strength is important are branched high melt viscosity poly(1,4-butylene terephthalate) resins which include a small amount, up to 5 mol percent of the terephthalic units, of a branching component containing at least three ester-forming groups. The branching component can be one which provides branching in the acid unit portion of the polyester, or in the glycol unit portion, or in both portions. Illustrative of such branching components are tri- or tetra-carboxylic acids such as trimesic acid, pyromellitic acid, and lower alkyl esters thereof and the like, or preferably, polyols and especially preferably, tetrols such as pentaerythritol, triols such as trimethylolpropane, or dihydroxycarboxylic acids and hydroxydicarboxylic acids and derivatives such as dimethyl hydroxyterephthalate and the like.

The branched poly(1,4-butylene terephthalate) resins and their preparation are described in Borman U.S. Pat. No. 3,953,404, which is hereby incorporated by reference.

In general, the poly(butylene terephthalate) component can be replaced in part with any of the poly($C_2$–$C_6$ alkylene phthalates) including the polyesters of isophthalic acid, terephthalic acid, phthalic acid, hexahydrophthalic acid, and naphthalic acid with ethylene glycol, 1,3-propanol, 1,5-pentanediol and 1,6-hexane diol. The poly(butylene terephthalate) can furthermore be replaced in part by copolyesters prepared from the justmentioned materials. The polyesters which are present in compositions of the present invention have molecular weights which are sufficiently high that the polyesters possess structural engineering properties, including sufficient rigidity, to render them suitable for their intended purposes.

The modifying rubbery vinyl polymers are well known in the art and are commercially available. The molecular weights of these polymers are sufficiently high that they are of rubbery consistency at room temperature. If desired, they may be slightly cross-linked to provide added stiffness at elevated temperatures.

It has further been found that even minor amounts of the modifying rubbery vinyl polymers are effective in providing significant improvements in impact resistance and the like. In general, the modifying rubbery vinyl polymers are present in an amount which is at least 1% and which is preferably between about 2.5% and about 40% of the weight of the total composition.

Particularly preferred as modifying rubbery vinyl polymers are the following: cis-polybutadiene having a molecular weight in excess of 500,000; poly(isoprene-isobutylene) in which the isoprene and isobutylene molar ratio is 1:1 to 1:100; and poly(butadiene-acrylonitrile) which is a 1:2 to 2:1 molar ratio butadiene:acrylonitrile copolymer.

The optional aromatic polycarbonates can be any of the polycarbonates which are employed as thermoplastic structural polymers. Of these, polybisphenol A carbonate is preferred since this polymer is available commercially and possesses excellent chemical and physical properties for molding purposes.

The modifying vinyl polymers are optionally added to the molding composition in conjunction with a polyethylene, preferably a low-density polyethylene, which acts as carrier therefor. Preferably the modifying polymers and the polyethylene are melted together to form a homogeneous fused mass which is extruded and the extrudate chopped to granular dimensions in any convenient way. The polyethylene facilitates dispersion of the modifying polymer in the polyalkylene terephthalate when the components are fused during the molding operation.

In certain preferred embodiments the molding compositions contain fillers, especially reinforcing fillers such as fibrous (filamentous) glass or graphite fibers or "whiskers" together with mineral fillers such as mica, talc and, preferably, clay. The fillers can be untreated or they can be coated with silane or titanate coupling agents, etc. The filamentous glass which is employed as reinforcement in such embodiments is well known to those skilled in the art and is widely available from a number of manufacturers. For the production of electrical components it is preferred to use fibrous glass filaments of a lime-aluminum borosilicate glass that is substantially soda-free. This is known as "E" glass. However, other glasses are useful where electrical properties are not so important, e.g., the low soda glass known as "C" glass. The filaments are made by standard processes, e.g., by steam, air or flame blowing, or by mechanical pulling. The preferred filaments for plastic reinforcement are made by mechanical pulling. The filament diameters range from about 0.00012" to 0.00075", but this is not critical to the present invention.

The length of the glass filaments and whether or not they are bundled into fibers and the fibers bundled in turn into yarns, ropes or rovings, or woven into mats and the like, are also not critical to the invention. However, in preparing the molding compositions, it is convenient to use the filamentous glass in the form of chopped strands between about ⅛" and about 2" long. Shorter lengths are suitable because, during the compounding step, considerable fragmentation occurs. This is desirable because the best properties are possessed by thermoplastic injection molded articles in which the filaments are between about 0.0005" and 0.25" long.

The amount of filler which is optionally present in the composition varies widely depending on the properties which it is desired that the finished molding should have, it being essential only that the amount of filler which is employed be sufficient to provide at least some reinforcement. Preferably the weight of the reinforcing filler is between about 1% and about 60% of the combined weight of filler and the polymeric components.

It has also been discovered that the polyester compositions of this invention which contain modifiers and fibrous glass exhibit improved impact and flexural properties when the glass is pre-dispersed in the resin.

The compositions can be rendered flame retardant with an effective amount of a conventional flame retardant. As is well known, flame retardants can be based on elementary red phosphorus, and on phosphorus, halogen and nitrogen compounds alone but preferably on these retardants in combination with synergists such as antimony compounds. Especially useful are polymeric and oligomeric flame retardants which comprise tetrabromobisphenol A carbonate units; see for example Wambach U.S. Pat. No. 3,833,685, hereby incorporated by reference.

Other ingredients such as dyes, pigments, drip retardants and stabilizers can be added for their conventional purposes.

The compositions of this invention can be prepared by a number of procedures. According to one procedure, the structural resin component or components, the vinyl modifier component and any reinforcement material (glass or graphite fibers) or non-reinforcing filler, stabilizer or fire retardant are put into an extrusion compounder to produce molding pellets. In the process the additives are dispersed in a matrix of the resinous components forming a homogeneous mixture, and the pellets are fed to any desired molding machine. According to another procedure the components are dry mixed and either fluxed on a mill and comminuted, or the mixture is extruded and the extrudate is chopped to form a granular product of homogeneous composition which is suitable as feed for a molding machine.

It is always important to free all of the ingredients (polymers, reinforcements, filler if used and any other additives) from as much water as possible, for example by heating under vacuum at 100° C. for 12 hours.

The compounding operation should be carried out to ensure that the residence time of the mixture in the machine is no longer than is necessary to form a homogeneous mixture of extrudable viscosity. The temperature of the mixture should not be permitted to rise above the minimum needed for that purpose, and the frictional heat which develops should be taken into account. For the extrusion step a single screw extruder is fed with either the pellets or the dry mixture referred to, the screw employed having a long transition section to ensure proper melting. On the other hand, a twin screw extrusion machine, e.g., a 28-mm. Werner-Pfleiderer machine can be fed with the resinous components at the feed port and the reinforcements, fillers and other additives can be introduced at a port downstream. In either instance, a generally suitable machine temperature is between about 450° F. and 550° F.

The compositions can be injection-molded in any equipment conventionally used for molding glass-filled thermoplastic compositions, e.g., a Newbury-type injection molding machine with a cylinder temperature in the range of 450° F.–525° F. and with a mold temperature in the range of 130° F.–150° F.

The invention is further illustrated by the examples which follow. These examples are preferred embodiments of the invention and are not to be construed in limitation thereof. Parts are by weight except where otherwise stated.

EXAMPLE 1

A. A molding composition is prepared by tumble mixing 80 parts of poly(1,4-butylene terephthalate) (Valox 315 of General Electric Co.), 10 parts of a very high (700,000) molecular weight cis-polybutadiene (Taktene 1202 of Polysar, Ltd.) and 10 parts of low density polyethylene as carrier for the cis-polybutadiene. The components had previously been dried for 12 hours at 100° C. and were in a granular state. The resulting homogeneous mixture is compression molded into pellets which are fed into a laboratory Sterling extruder operating at 245° C. Strips are extruded which are tested by standard laboratory procedure. Results are as follows:

| Impact resistance: | |
|---|---|
| Izod, notched, ft.-lb./in. | 2.9 |
| Izod, unnotched, ft.-lb./in. | 22 |
| Gardner, impact to dislodge (in lbs.) | 350 |
| Flexural strength, p.s.i. | 7,900 |
| Flexural modulus, p.s.i. | 229,000 |
| Tensile strength, p.s.i. | 5,100 |
| Elongation, % | 190 |
| Viscosity, melt, (poises) | |
| at 266° C. | 7,100 |
| at 250° C. | 12,400 |

B. A control extrusion made in the same manner from poly(1,4-butylene terephthalate) resin alone has a notched Izod impact strength of 1.0 ft.-lb./in.

C. The pellets of composition A above are fed into a laboratory injection molding machine operating at 245° C. (mold temperature 90° C.). Very satisfactory moldings are obtained, which have a high resistance to fracture under impact at room temperature.

EXAMPLE 2

The procedure of Example 1-A is repeated except that five parts of the polyethylene are replaced by five parts of poly(bisphenol A carbonate) resin (Lexan 315 of General Electric Co.). The resulting test strip possesses substantially improved impact resistance.

EXAMPLE 3

The procedure of Example 1-A is repeated twice, each time with a substitution of one of the materials. In the first repetition (run A) the polybutadiene of Example 1-A is replaced by 10 parts of poly(isoprene-isobutylene) resin (Butyl 301 of Polysar Ltd.). In the second repetition (run B) the polybutadiene is replaced by 10 parts of another poly(isoprene-isobutylene) resin (Butyl 111 of Polysar Ltd.). Results are as follows:

| Properties | Run A | Run B |
|---|---|---|
| Impact Resistance: | | |
| Izod, notched, ft.-lb./in. | 2.71 | 3.41 |
| Izod, unnotched, ft.-lb. in. | 34.7 | 32.0 |
| Gardner, impact to dislodge (in lbs.) | 108 | 450 |
| Flexural strength, p.s.i. | 8408 | 8408 |
| Flexural modulus, p.s.i. | 243,770 | 245,512 |
| Tensile strength, p.s.i. | 5453 | 5453 |
| Elongation, % | 99.9 | 123.7 |
| Viscosity, melt, (poises) | | |
| at 266° C. | 3697 | 3963 |
| at 250° C. | 6389 | 6319 |

A control molding prepared in the same manner from 100% poly(1,4-butylene terephthalate) has a notched Izod impact value of 1.0 ft.-lb./in.

EXAMPLE 4

The comparative effect of a series of commercial poly(butadiene-acrylonitrile) rubbers in improving the impact strength of poly(1,4-butylene terephthalate) resin extrusions is illustrated by the following.

The compositions and molecular weights of the rubbers used are as follows:

| No. | Bound ACN (%) | Mooney Viscosity at 100° C. | Commercial Designation |
|---|---|---|---|
| 1 | 27 | 50 | Krynac 27.50 |

| No. | Bound ACN (%) | Mooney Viscosity at 100° C. | Commercial Designation |
|---|---|---|---|
| 2 | 34 | 60 | Krynac 34.60 |
| 3 | 47.5–51.1 | 68–82 | Krynac 806 |
| 4 | — | 50 | Krynac 110C |
| 5 | — | 50 | Krynac 221 |

In each run a molding composition is prepared by the method of Example 1-A by tumbling together 80 parts of poly(1,4-butylene terephthalate), 10 parts of one of the butadieneacrylonitrile rubbers referred to above, and 10 parts of low-density polyethylene as carrier. The compositions are extruded to form test pieces which are tested by the method of Example 1 with results as follows.

| Properties | Butadiene-Acrylonitrile Polymer No. | | | | |
|---|---|---|---|---|---|
| | 1 | 2 | 3 | 4 | 5 |
| Impact resistance: | | | | | |
| Izod, notched[1] | 3.73 | 3.90 | 3.44 | 4.02 | 4.59 |
| Izod, unnotched[1] | 27.4 | 29.3 | 33.6 | 25 | 35.1 |
| Gardner impact to dislodge (in lbs.) | 150 | 200 | 80 | 150 | 300 |
| Flexural strength[2] | 8209 | 8487 | 8765 | 8606 | 8546 |
| Flexural modulus[2] | 229,144 | 223,192 | 238,692 | 235,422 | 235,423 |
| Tensile strength[2] | 5252 | 5408 | 5448 | 5305 | 5431 |
| Elongation, % | 192.8 | 184.5 | 246.3 | 209 | 259.4 |
| Visc., melt, (poises) | | | | | |
| at 266° C. | 5787 | 6781 | 3546 | 3890 | 5472 |
| at 250° C. | 9319 | 12073 | 7342 | 7095 | 10166 |

[1]Ft.-lb./in.
[2]p.s.i.

The above identified patents and/or patent applications are incorporated herein by reference. Obviously, other modifications and variations of the present invention are possible in the light of the above teachings. It is therefore to be understood that changes may be made in the particular embodiments described above which are within the scope of the invention as defined in the appended claims.

We claim:

1. A thermoplastic molding composition comprising:
   (i) a poly(butylene terephthalate) resin as the principal resinous component therein, and
   (ii) a minor amount of at least one rubbery vinyl polymer consisting essentially of a member selected from the group consisting of cis-polybutadiene, poly(butadiene-acrylonitrile), and poly(isoprene-isobutylene) as agent improving the resistance of articles molded from said composition to fracture under impact.

2. A composition according to claim 1 wherein said poly(butylene terephthalate) resin is poly(1,4-butylene terephthalate) resin.

3. A composition according to claim 1 wherein said cis-polybutadiene has a molecular weight in excess of 500,000.

4. A composition according to claim 1 wherein the poly(isoprene-isobutylene) is a copolymer of isoprene and isobutylene in 1:1 to 1:100 molar ratio.

5. A composition according to claim 1 wherein said poly(butadiene-acrylonitrile) is a 1:2 to 2:1 molar ratio butadiene: acrylonitrile copolymer.

6. A composition according to claim 1 containing a small but effective amount of polyethylene as carrier for said vinyl polymer.

7. A composition according to claim 6 wherein said polyethylene is low density polyethylene.

8. A composition according to claim 1 containing a minor but effective amount of an aromatic polycarbonate as supplementary impact resistance-improving agent.

9. A composition according to claim 1 containing at least one material selected from the group consisting of fibrous strengthening materials, inorganic fillers, mold lubricants, stabilizers and flame retardants.

10. A composition according to claim 1 in compression molded form.

11. A composition according to claim 1 in fusion-molded form.

12. A method of improving resistance to fracture upon impact of molded articles of a poly(butylene terephthalate) resin composition, which comprises:
   adding to said composition prior to molding an effective amount of at least one rubbery vinyl polymer consisting essentially of a member selected from the group consisting of cis-polybutadiene, poly(butadiene-acrylonitrile), and poly(isoprene-isobutylene) to improve the resistance of said articles molded from said composition to fracture under impact.

13. A method according to claim 12 wherein said poly(butylene terephthalate) resin is poly(1,4-butylene terephthalate) resin.

14. A method according to claim 12 wherein said cis-polybutadiene has a molecular weight in excess of 500,000.

15. A method according to claim 12 wherein the poly(isoprene-isobutylene) is a copolymer of isoprene and isobutylene in 1:1 to 1:100 molar ratio.

16. A method according to claim 12 wherein said poly(butadiene-acrylonitrile) is a 1:2 to 2:1 molar ratio butadiene: acrylonitrile copolymer.

17. A method according to claim 12 further comprising adding to said resin a small but effective amount of polyethylene as carrier for said vinyl polymer.

18. A method according to claim 17 wherein said polyethylene is low density polyethylene.

19. A method according to claim 12 further comprising adding to said resin a minor but effective amount of an aromatic polycarbonate as supplementary impact resistance-improving agent.

20. A method according to claim 12 further comprising adding to said resin at least one material selected from the group consisting of fibrous strengthening materials, inorganic fillers, mold lubricants, stabilizers and flame retardants.

* * * * *